(12) United States Patent
Adkins et al.

(10) Patent No.: US 6,599,952 B2
(45) Date of Patent: *Jul. 29, 2003

(54) POLYETHER POLYOLS WITH INCREASED FUNCTIONALITY

(75) Inventors: Rick L. Adkins, New Martinsville, WV (US); Harold R. Parsons, Wheeling, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/017,045

(22) Filed: Dec. 13, 2001

(65) Prior Publication Data

US 2003/0119930 A1 Jun. 26, 2003

(51) Int. Cl.[7] ........................ C08G 18/08; C07C 43/00
(52) U.S. Cl. ............ 521/174; 252/182.26; 252/182.27; 252/182.34; 521/164; 521/166; 568/583; 568/606; 568/704; 568/712
(58) Field of Search ................ 521/164, 166, 521/174; 568/583, 606, 704, 712; 252/182.26, 182.27, 182.34

(56) References Cited

U.S. PATENT DOCUMENTS

| | | |
|---|---|---|
| 3,085,085 A | 4/1963 | Wismer et al. |
| 3,153,002 A | 10/1964 | Wismer et al. |
| 3,941,769 A | 3/1976 | Maassen et al. |
| 3,981,829 A * | 9/1976 | Cenker et al. ............ 521/107 |
| 4,230,824 A | 10/1980 | Nodelman ............ 521/167 |
| 4,380,502 A | 4/1983 | Müller et al. |
| 4,446,313 A | 5/1984 | Dix et al. |
| 4,820,810 A | 4/1989 | Klein et al. |
| 4,996,310 A | 2/1991 | Axosta |
| 5,106,883 A * | 4/1992 | Horacek ............ 521/105 |
| 5,596,059 A | 1/1997 | Hager et al. |
| 5,625,045 A | 4/1997 | Gupta et al. |

FOREIGN PATENT DOCUMENTS

| | | |
|---|---|---|
| CA | 2143972 | 9/1995 |
| EP | 0 491 233 | 6/1992 |

OTHER PUBLICATIONS

J. Org. Chem., 13, (1948) pp. 782–785, J. W. Lemaistre and Raymond B. Seymour, The Reaction of Sucrose With Ethylene Oxide.

* cited by examiner

*Primary Examiner*—John M. Cooney, Jr.
(74) *Attorney, Agent, or Firm*—Joseph C. Gil; N. Denise Brown

(57) ABSTRACT

This invention relates to a process for the preparation an epoxide-reactive compound having a functionality of at least 3, a molecular weight of from about 250 to about 1,900, and an OH number of from about 85 to about 1,400. This process comprises reacting (a) an organic compound which is free of ether groups, having a molecular weight of from about 60 to about 600, and containing from about 2 to about 8 reactive sites; with (b) cyanuric chloride; optionally, in the presence of (c) one or more catalysts; wherein the functionality of the resultant epoxide-reactive compound equals three times the functionality of (a) said organic compound minus three. This invention also relates to further reacting the epoxide-reactive compound produced by the above process with an alkylene oxide, optionally in the presence of a catalyst to form a polyether polyol having a functionality of at least about 3, a molecular weight of from about 300 to about 18,000, and an OH number of from about 10 to about 565.

12 Claims, No Drawings

POLYETHER POLYOLS WITH INCREASED FUNCTIONALITY

FIELD OF THE INVENTION

This invention relates to a process for the preparation an epoxide-reactive compound having a functionality of at least 3, a molecular weight of from about 250 to about 1,900, and an OH number of from about 85 to about 1,400. This process comprises reacting (a) an organic compound which is free of ether groups, having a molecular weight of from about 60 to about 600, and containing from about 2 to about 8 reactive sites; with (b) cyanuric chloride; optionally, in the presence of (c) one or more catalysts; wherein the functionality of the resultant epoxide-reactive compound equals three times the functionality of (a) the organic compound minus three. This invention also relates to further reacting the epoxide-reactive compound produced by the above process with an alkylene oxide, optionally in the presence of a catalyst to form a polyether polyol having a functionality of at least about 3, a molecular weight of from about 300 to about 18,000, and an OH number of from about 10 to about 565.

BACKGROUND OF THE INVENTION

High functionality polyether polyols with acceptable viscosities are used as the isocyanate-reactive component in the production of rigid polyurethane foams. Polyether polyols are conventionally prepared by the alkoxylation of a suitable starter, which contains one or more OH or NH groups in the presence of a suitable catalyst. Commonly used rigid foam polyols have OH-numbers from 350 to 650, viscosities at 25° C. range from 300 mPa·s to 35,000 mPa·s. Suitable starter materials used to produce polyether polyols include glycols, glycerin, trimethylolpropane, sorbitol, sucrose, and aliphatic and aromatic amines. Propylene oxide is the most commonly used alkylene oxide. Further, in order to produce rigid polyurethane foams it is necessary to employ a polyether polyol with a functionality greater than 3. Therefore, the alcohols employed to produce a polyol must have a high functionality in order to admix and react with the alkylene oxides and obtain a functionality greater than 3.

It is known to prepare sucrose polyether polyols by reacting sucrose with alkylene oxide in an aqueous solution in the presence of sodium hydroxide. See, for example, LeMaistre, et al., J. Org. Chem., 13, p. 782, (1948). U.S. Pat. Nos. 3,085,085 and 3,153,002 disclose a process based on this reaction in which sucrose is reacted at elevated temperatures with ethylene oxide or propylene oxide in a concentrated aqueous solution in the presence of potassium hydroxide catalyst.

Most processes for sucrose based polyether polyols described in the literature involve the reaction of the sucrose with alkylene oxide in volume. This reaction has the advantage that products of high functionality (i.e. 7 to 8) are obtained and that the reaction time is short. In this way the sucrose is suspended in the alkylene oxide. However, in this way polyether polyols with high viscosity normally between 40,000 and 400,000 centipoises at ambient temperature, are obtained. This is not practical since problems are caused in the handling of the high viscosity polyether polyol in normal foaming machines. Also, there is a risk represented by handling large quantities of alkylene oxide within the reactors at the reaction temperature due to the high vapor pressure, which makes this highly explosive.

U.S. Pat. No. 3,941,769 discloses a process in which sucrose is reacted with epoxide in an organic; dispersing agent such as benzene, toluene, ethylbenzene, xylene or chlorobenzene (boiling range 80°–180° C.). This process has some serious disadvantages, however. First, the dispersing agents lower the reaction capacity by 10–40%. Second, the dispersing agent must be removed at the end of the production process. The products obtained by this process have high functionalities and high viscosities (104,000–400,000 mPa·s) due to the degree of alkoxylation. These also exhibit an intense brown color.

U.S. Pat. No. 4,380,502 discloses the use of polyether polyols made by alkoxylating a mixture which is from 20 to 80 wt. % sucrose and 80 to 20 wt. % formitol. This reference teaches that the polyether polyols prepared therein exhibit a color ranging from clear to yellowish.

U.S. Pat. No. 4,230,824 discloses a, method for preparing a sucrose based polyether polyol which involves the use of a polyalkylene polyamine as both co-initiator and catalyst for the alkoxylation reaction of sucrose. This reference reports that the resulting polyether polyols are very high in color content.

U.S. Pat. No. 4,996,310 discloses a polyol-polyether having a molecular weight between 400 and 900, a viscosity between 500 and 3,500 centipoises at 25° C., and a content of ethylene oxide between 40% and 75% by weight. The polyether polyol is prepared by a process which comprises the steps of: (a) forming a suspension of sucrose in a triol; (b) reacting the mixture obtained in the prior step with propylene oxide in the presence of a catalyst; (c) suspending sucrose in the mixture obtained in the prior step; (d) oxyethylizing the mixture of step (c); and (e) eliminating the volatile components of the mixture and the catalyst.

U.S. Pat. No. 5,625,045 discloses a method for preparing high functionality, low viscosity, light colored sucrose-based polyethers polyols by reacting a starter mixture containing i) sucrose, ii) a low molecular weight, relatively high valency alcohol and/or an alkoxylation product of such an alcohol and iii) an alkali metal hydroxide, with an alkylene oxide at a temperature of from about 90° to about 130° C. and at a pressure of from about 0.3 to about 4 bar excess nitrogen pressure. These sucrose based polyether polyols are suitable for use in rigid polyurethane foam applications.

U.S. Pat. No. 4,332,936 describes a method for making polyether polyols from solid initiator compounds containing from 4 to 8 hydroxyl groups. The method involves dissolving the solid initiator compound in a solvent such as dimethyl formamide prior to alkoxylation. The method is particularly useful in making high functionality sucrose-based polyether polyols that can be readily processed at moderate temperatures and give low color products. These polyether polyols are particularly suited for the production of rigid polyurethane foams.

U.S. Pat. No. 4,820,810 discloses that urea is an effective catalyst and co-initiator for the alkoxylation of aqueous sucrose solutions and results in polyether polyol products with low color content.

U.S. Pat. No. 4,446,313 describes a process for the manufacture of a polyether polyol by reaction between an organic compound containing 2 or more active hydrogen atoms in the molecule and an alkylene oxide in the presence of a catalyst comprising a tertiary amine. Suitable tertiary amine catalysts have the formula $NRR'_2$ in which R is a cycloalkyl or cycloalkenyl group and each R' may be an alkyl, cycloalkyl or cycloalkenyl group.

U.S. Pat. No. 5,596,059 discloses polyoxyalkylene polyether polyols suitable for preparation of flexible polyurethane foams. These are prepared by oxyalkylating an aqueous solution of one or more polyhydric, hydroxyl-functional solid initiators under conditions where both water as well as initiator are oxyalkylated. The polyether polyols have calculated functionalities of between about 2.2 and 4.0 and hydroxyl numbers in the range of 10 to 180. The polyether polyols may be used to prepare soft, high resiliency polyurethane flexible foams at low isocyanate indexes.

EP 491233A1 discloses low viscosity, high functionality polyetherols obtained by reaction of a compound containing 2 to 8 active hydrogen in the form of hydroxyl groups, thiol groups, primary amino groups and/or secondary amino groups with one or more epoxides in the presence of a base to form an intermediate. This intermediate is further reacted with a q-valent compound that contains at least one epoxy group and at least one chlorine or bromine atom to form the polyetherols. The chlorine containing compounds referred to are epichlorohydrin types molecules.

EP 671424B1 discloses a process for the production of a high functionality, modified polyether polyol by reacting n moles of a starting polyether polyol having a functionality of x with m moles of a compound having a functionality of y which compound has groups that are reactive with hydroxyl groups. The product of nx is described as greater than the product of my. If more than one starting polyether polyol is used, the value of x for each polyether polyol may be the same or it may be different. The polyether polyol produced by this reaction is a high functionality, modified polyether polyol having a total functionality of $(\Sigma nx-my)/m$.

Applicants' copending U.S. application Ser. No. 10/016, 846, filed the same day as the present application and which is commonly assigned, describes a process for the preparation of a polyether polyol having a functionality of at least about 3, a molecular weight of from about 560 to about 35,000 and an OH number of from about 10 to about 1,100. The process comprises reacting (a) a polyether polyol containing one or more ether groups, with (b) cyanuric chloride, optionally, in the presence of (c) one or more catalysts. The functionality of the resultant polyether polyols equals three times the functionality of (a) the polyether polyol, minus three. This copending application also describes the process of reacting a polyether polyol, formed by the stated reaction with cyanuric chloride, with an alkylene oxide, optionally in the presence of a catalyst, to form a higher molecular weight polyether polyol. The resultant polyether polyols are also disclosed.

The advantage of this invention is that it gives a versatile process for producing polyol starters of any desired functionality under relatively mild conditions. High temperatures and temperatures are not required (<100° C., atmospheric pressure are possible). These high functionality starters can then be used in the production of higher molecular weight polyols.

As is evident from the above, there is no method for the production of high functionality epoxide-reactive component based on cyanuric chloride.

OBJECT OF THE INVENTION

An object of the present invention is to form an epoxide-reactive component from known, commercially available organic compounds. Another object is to react these epoxide-reactive components, with an alkylene oxide, optionally in the presence of a catalyst, to form polyether polyols. Both the epoxide-reactive component and the polyether polyol made therefrom can be used in polyurethane rigid foam applications. A further object is to form the isocyanate-reactive component and the polyether polyol made therefrom with functionalities of at least 3. In addition to meeting the stated functionality object, the process according to the present invention produces polyether polyols that exhibit increased reactivity towards isocyanates.

SUMMARY OF THE INVENTION

This invention relates to a process for the preparation an epoxide-reactive compound having a functionality of at least 3, a molecular weight of from about 250 to about 1,900, and an OH number of from about 85 to about 1,400. This process comprises reacting (a) an organic compound which is free of ether groups, having a molecular weight of from about 60 to about 600, and containing from about 2 to about 8 reactive sites; with (b) cyanuric chloride; optionally, in the presence of (c) one or more catalysts; wherein the functionality of the resultant epoxide-reactive compound equals three times the functionality of (a) said organic compound minus three. This invention also relates to further reacting the epoxide-reactive compound produced by the above process with an alkylene oxide, optionally in the presence of a catalyst to form a polyether polyol having a functionality of at least about 3, a molecular weight of from about 300 to about 18,000, and an OH number of from about 10 to about 565.

DETAILED DESCRIPTION OF THE INVENTION

The epoxide-reactive compounds produced according to the present invention have a functionality of at least 3, preferably about 4 to 8, a molecular weight of from about 250 to about 1,900, preferably from about 300 to about 700, and an OH number of from about 85 to about 1,400, preferably from about 700 to about 1,300. These epoxide-reactive compounds are formed by the reaction of (a) an organic compound containing at least two epoxide-reactive sites; with (b) cyanuric chloride; optionally, in the presence of (c) one or more catalysts. The functionality of the resultant epoxide-reactive compound is equal to three times the functionality of (a) the organic compound minus three. The functionality of the resultant epoxide-reactive compound, f(p), can be represented by the following formula:

$$f(p)=(3\times f(a))-3,$$

wherein:

f(a): represents the functionality of the organic compound (a).

Component (a) comprises an organic compound that is free of ether groups, has a molecular weight of from about 60 to about 600, and contains from about 2 to about 8 reactive sites. Any presently known low molecular weight organic compound that is free of ether groups and meets the functionality and molecular weight requirements as stated can be used as component (a). Preferably, these organic compounds are not formed with ethylene or propylene oxide, but rather contain hydroxyl groups and/or amine groups and/or thiol groups.

Suitable ether-free organic compounds to be used as component (a) in the process of the present invention include known starter compounds having molecular weights of 60 to 600, and having from 2 to 8 hydroxyl groups, 2 to 8 thiol groups and/or 1 to 4 amino groups. Specific examples of starter compounds from which suitable organic compounds may be made include: ethylene glycol, 1,2-propylene glycol, 1,4-butanediol, hexamethylene glycol, bisphenol A, trimethylolpropane, glycerol, pentaerythritol, sorbitol, water, methylamine, ethylamine, propylamine, butylamine, aniline, benzylamine, o- and p-toluidine, α- and β-naphthylamine, ammonia, ethylenediamine, propylenediamine, 14-butylene-diamine, 1,2-, 1,3-, 1,4-, 1,5- and 1,6-hexamethylenediamine, o-, m- and p-phenylenediamine, 2,4-, 2,6-tolylenediamine, 2,2'-, 2,4- and 4,4'-diamino-diphenylmethane and diethylenediamine, or mixtures of these compounds. Also suitable are thiol alcohols or thiol amines such as, for example, 1-thioglycerol, thiosorbitol, 2-mercaptoethanol, 2-aminoethane- thiol, 2-aminothiazole, etc.

Component (a) is present in the reaction with (b) cyanuric chloride in amounts such that there are from 1 to 5 moles of component (a), for each 1 mole of component (b), the cyanuric chloride. Preferably, component (a) is present in an amount such that there are from 2 to 3 moles of the organic compound (a) for each 1 mole of component (b), the cyanuric chloride.

When optional component (c), the catalyst(s), is present in the reaction, it is present in an amount such that there are 0.1 to 1.0 equivalent of the catalyst(s), per 1 equivalent of cyanuric chloride, component (b). Suitable catalysts are well known in the art of polyether polyol production such as catalysts suitable in the alkoxylation process. Examples of suitable catalysts include alkali hydroxides, e.g., potassium hydroxide and sodium hydroxide, an amine catalyst, preferably a tertiary amine, DMC (double metal cyanide) catalysts and mixtures thereof. If present in the reaction, preferably the catalyst is sodium hydroxide or potassium hydroxide.

The reaction of (a) an organic compound which is free of ether groups, has a molecular weight of about 60 to about 600, and contains from about 2 to about 8 reactive sites, with (b) cyanuric chloride, optionally, in the presence of (c) one or more catalysts to form the high functionality epoxide-reactive compound can be represented by the following formula I.

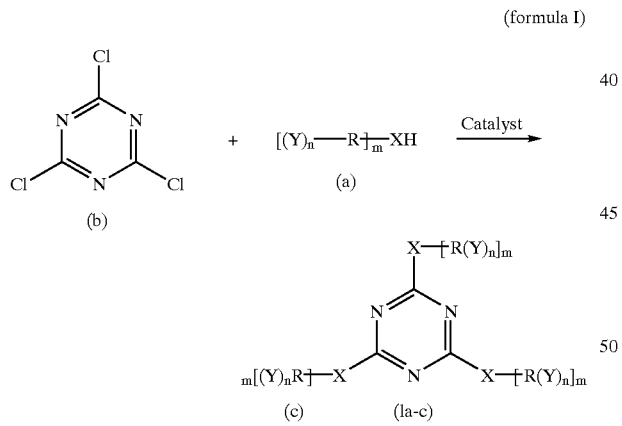

wherein:
each R: individually represents an alkyl group containing from 2 to 10 carbon atoms, which may optionally be substituted with 10 one or more heteroatoms selected from the group consisting of nitrogen atoms, sulfur atoms and mixtures thereof; an alicyclic group containing from 3 to 15 carbon atoms, which may optionally be 1 5 substituted with one or more hetero- atoms selected from the group consisting of nitrogen atoms, sulfur atoms and mixtures thereof; an aryl group containing from 4 to 14 carbon 20 atoms, which may optionally be substituted with one or more heteroatoms selected from the group consisting of nitrogen atoms, sulfur atoms and mixtures thereof; or an 25 aralkyl group containing from 5 to 15 carbon atoms, which may optionally be substituted with one or more heteroatoms selected from the group consisting of nitrogen atoms, sulfur atoms and mixtures thereof;

each X: individually represents an oxygen atom, a nitrogen atom, a sulfur atom, or a NH group;

each Y: individually represents an OH group, an $NH_2$ group or an SH group;

m equals 1 or 2;

and n is greater than or equal to 0, except for when X represents an oxygen atom, a sulfur atom or a nitrogen atom, then n is greater than or equal to 1.

The process according to the invention can be described as follows. The organic compound (a) and, if present, the catalyst (c) are added to a reactor under nitrogen. The cyanuric chloride (b) is added such that the exothermic reaction is maintained at 40° C. or less. After all the cyanuric chloride (b) is added, the solution is then heated for about 1 to about 2 hours at about 80 to about 90° C.

Optionally, any suitable solvent, such as, for example, acetone or acetonitrile may be present in the reaction. If such a solvent is present, it is preferably added to the starting organic compound (a) and the catalyst (c) (when present), before the cyanuric chloride is added. The solvent is present in amounts such that there are about 0.2 to 5 ml of solvent per gram of component (a).

Another aspect of the present invention comprises the epoxide-reactive compounds produced by the above described process. These epoxide-reactive compounds are characterized as having a functionality of at least 3, a molecular weight of from about 250 to about 1,900 and an OH number of from about 85 to about 1,400, and correspond to the general formula:

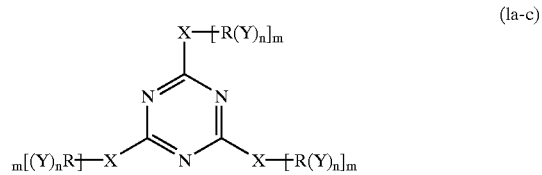

each R: represents an alkyl group containing from 2 to 10 carbon atoms, which may optionally be substituted with one or more heteroatoms selected from the group consisting of nitrogen atoms, sulfur atoms and mixtures thereof; an alicyclic group containing from 3 to 15 carbon atoms, which may optionally be substituted with one or more heteroatoms selected from the group consisting of nitrogen atoms, sulfur atoms and mixtures thereof; an aryl group containing from 4 to 14 carbon atoms, which may optionally be substituted with one or more heteroatoms selected from the group consisting of nitrogen atoms, sulfur atoms and mixtures thereof; or an aralkyl group containing from 5 to 13 carbon atoms, which may optionally be substituted with one or more heteroatoms selected from the group consisting of nitrogen atoms, sulfur atoms and mixtures thereof;

each X: individually represents an oxygen atom, a nitrogen atom, a sulfur atom, or a NH group;

each Y: individually represents an OH group, an $NH_2$ group or an SH group;

m equals 1 or 2;

and n is greater than or equal to 0, except for when X represents an oxygen atom, a sulfur atom or a nitrogen atom, then n is greater than or equal to 1.

The process of the present invention further comprises (1) reacting (d) the epoxide-reactive compound having a functionality of 3 to 15, a molecular weight of from about 250 to about 1,900, and an OH number of from about 85 to about 1,400, and which is produced by the above process; with (e) an alkylene oxide; optionally, in the presence of (f) one or more catalysts; wherein the functionality of the resultant polyether polyol is greater than or equal to the functionality of said epoxide-reactive compound.

The alkylene oxide (e) reactant is suitably of the class conventionally employed in the production of polyol polyethers. Preferred alkylene oxides are ethylene oxide, propylene oxide, butylene oxide, tetrahydrofuran, styrene oxides and mixtures thereof. If desired, one alkylene oxide may be initially utilized in a first stage of the etherification reaction and another alkylene oxide in a later stage. The amount of alkylene oxide used in the reaction according to the invention, relative to the quantity of polyol converted, determines the functionality and molecular weight of the polyether product.

Suitable catalysts (f) are well known in the art of polyether polyol production such as catalysts suitable in the alkoxylation process. Examples of suitable catalysts include alkali hydroxides, e.g., potassium hydroxide and sodium hydroxide, an amine catalyst, preferably a secondary or tertiary amine, DMC (double metal cyanide) catalysts and mixtures thereof.

Process conditions for the alkoxylation reaction are known in the art. Thus, reaction temperatures between about 50° and 160° C., as have typically been employed for the alkoxylation of active hydrogen containing compounds, may suitably be utilized in the process of the invention.

Temperatures between 80° and 130° C. are generally preferred. Since it is desirable to maintain the alkylene oxide in the vapor state, pressures up to the standard vapor pressure of the alkylene oxide at the reaction temperature are preferred; particularly preferred are pressures in the range of from about 1 to 10 atmospheres.

It is preferred, but not necessary, to include the step of alkoxylation in the present invention to yield high functionality polyether polyols. The epoxide-reactive compounds formed by reacting an organic compound which is free of ether groups, with cyanuric chloride, optionally, in the presence of one or more catalysts, shows an increased reactivity with respect to isocyanates. The polyether polyols, obtained after the step of alkoxylation also shows a high reactivity with respect to isocyanates and are particularly suitable for the production of cellular or non-cellular polyurethanes in accordance with the general methods described in the literature, for instance by reacting the polyether polyols, possibly admixed with other active hydrogen atoms-containing compounds, with organic polyisocyanates, if desired in the presence of other substances, such as foaming agents, surface-active agents, flame-retarding agents and other additives known in the art.

In addition to exhibiting increased functionality over the starting epoxide-reactive compounds, the process of the present invention unexpectedly yielded polyether polyols with increased reactivity toward isocyanates. Polyether polyols prepared according to the invention exhibit a faster reaction rate than conventional polyether polyols. Since the reactivity of the resulting polyether polyols is higher, less catalyst is necessary in formulations to subsequently form polyurethanes from them.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following Table 1 illustrates the amount of material used in Example 1 which were reacted according to the invention to form the epoxide-reactive compound.

TABLE 1

| Example 1 | Amount |
|---|---|
| Organic Compound A | 300 g |
| Cyanuric Chloride | 21.5 g |
| Solvent A: | 50 mL |

Organic Compound A: an organic compound started from glycerin, having a functionality of three (3), a molecular weight about of 480 and an OH number of about 351; and being prepared by reacting 1 mole of glycerin with 5 to 8 moles of PO (propylene oxide) and 7% by weight of KOH, and dewatering to give 5% by wt. potassium
Solvent A: N-methylpyrrolidinone In Example 1 above, the cyanuric chloride was dissolved in Solvent A, thereby forming a solution. This solution was slowly added to Organic Compound A in the reaction vessel. The reaction mixture was heated to 100° C. and maintained at this temperature for about 2 hours. The resulting material was filtered, and Solvent A was removed by distillation. This process produced an epoxide-reactive compound (Epoxide-Reactive Compound A) having a functionality of 6, a molecular weight of about 351.

Table 2 below shows how the reactivity of polyether polyols produced according to the invention is increased compared to the reactivity of conventional polyols.

TABLE 2

| Example | Polyol | Reaction time | % NCO |
|---|---|---|---|
| 2A Comparative | Glycerine | 3.5 hours | 30.4 |
| 2B | Epoxide-Reactive Compound A | 12 minutes | 26.3 |

Epoxide-reactive compound A is the reaction product of Example 1. Both Examples 1 and the Comparative Example are reacted with 100 grams of 4,4'-diphenylmethane diisocyanate to form a polyurethane. The reaction time of Example 2B is considerably faster than the reaction time of Example 2A (comparative). The %NCO as set forth in Table 2 is the amount of reactive groups remaining in the polyurethane product, which illustrate the extent of the reaction. Example 2B has a lower %NCO which demonstrates that Epoxide-Reactive Compound A (representative of the present invention) reacted with more isocyanate groups than glycerin which was used in Example 2A (comparison example). Comparison of the %NCO and the reaction time in Table 2 reveals that Example 2B reacted faster and more completely than Example 2A (comparison example).

Although the invention has been described in detail in the foregoing for the purpose of illustration, it is to be understood that such detail is only for that purpose and that variations can be made therein by those skilled in the art without departing from the spirit and scope of the invention except as it may be limited by the claims.

What is claimed is:

1. A process for the preparation an epoxide-reactive compound having a functionality of at least 3, a molecular weight of from about 250 to about 1,900, and an OH number of from about 85 to about 1,400, comprising
   (1) reacting
      (a) an organic compound which is free of ether groups, having a molecular weight of from about 60 to about 600, and containing from about 2 to about 8 reactive sites; with
      (b) cyanuric chloride;
   optionally, in the presence of,
      (c) one or more catalysts;
   wherein the functionality of the resultant epoxide-reactive compound equals three times the functionality of (a) said organic compound minus three.

2. The process of claim 1, wherein said (1)(a) organic compound reactive sites are selected from the group consisting of hydroxyl groups, thiol groups, amine groups and mixtures thereof.

3. The process of claim 1, wherein the resultant epoxide-reactive compound has a functionality of about 4 to about 8, a molecular weight of from about 300 to about 700, and an OH number of from about 700 to about 1,300.

4. The process of claim 1, wherein component (a) said organic compound is present in an amount such that there are from 1 to 5 moles of (a) said organic compound for each 1 mole of component (b), the cyanuric chloride.

5. The process of claim 4, wherein component (a) said organic compound is present in an amount such that there are from 2 to 3 moles of (a) said organic compound for each 1 mole of component (b), the cyanuric chloride.

6. The process of claim 1, wherein the reaction between (a) the organic compound which is free of ether groups and (b) the cyanuric chloride occurs in the presence of (c) one or more catalysts and (d) a solvent.

7. The epoxide-reactive compounds produced by the process of claim 1.

8. An epoxide-reactive compound having a functionality of at least 3, a molecular weight of from about 250 to about 1,900, and an OH number of from about 85 to about 1,400, which corresponds to the general formula:

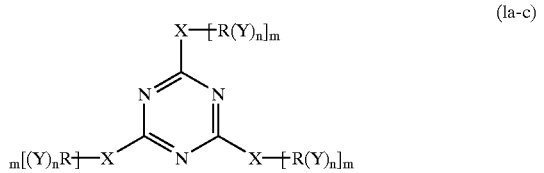

(Ia-c)

wherein:
   each R: represents an alkyl group containing from 2 to 10 carbon atoms, which may optionally be substituted with one or more heteroatoms selected from the group consisting of nitrogen atoms, sulfur atoms and mixtures thereof; an alicyclic group containing from 3 to 15 carbon atoms, which may optionally be substituted with one or more heteroatoms selected from the group consisting of nitrogen atoms, sulfur atoms and mixtures thereof; an aryl group containing from 4 to 14 carbon atoms, which may optionally be substituted with one or more heteroatoms selected from the group consisting of nitrogen atoms, sulfur atoms and mixtures thereof; or an aralkyl group containing from 5 to 13 carbon atoms, which may optionally be substituted with one or more heteroatoms selected from the group consisting of nitrogen atoms, sulfur atoms and mixtures thereof;

each X: individually represents an oxygen atom, a nitrogen atom, a sulfur atom, or a NH group;

each Y: individually represents an OH group, an $NH_2$ group or an SH group;

m equals 1 or 2;
   and
   n is greater than or equal to 0, except for when X represents an oxygen atom, a sulfur atom or a nitrogen atom, then n is greater than or equal to 1.

9. The epoxide-reactive compound of claim 8 having a functionality of about 4 to about 8, a molecular weight of about 300 to about 700, and an OH number of from about 700 to about 1,300.

10. A process for the preparation of a polyether polyol comprising:
   (1) reacting:
      (d) the epoxide-reactive compound of claim 8, with
      (e) an alkylene-oxide,
   optionally, in the presence of
      (f) one or more catalysts;
thereby forming a polyether polyol having a functionality which is greater than or equal to the functionality of (d) the epoxide-reactive compound.

11. The process of claim 10, wherein the resultant polyether polyol has a functionality of at least about 3, a molecular weight of about 300 to about 18,000, and an OH number of from about 10 to about 565.

12. A process for the production of a rigid polyurethane foam comprising reacting the epoxide-reactive compound of claim 8 with a polyisocyanate component.

* * * * *